Dec. 8, 1942.    A. D. GARGOLINSKI    2,304,162
YIELDING DRIVE FOR LOOM BOX MOTION
Filed Feb. 23, 1942    2 Sheets-Sheet 1
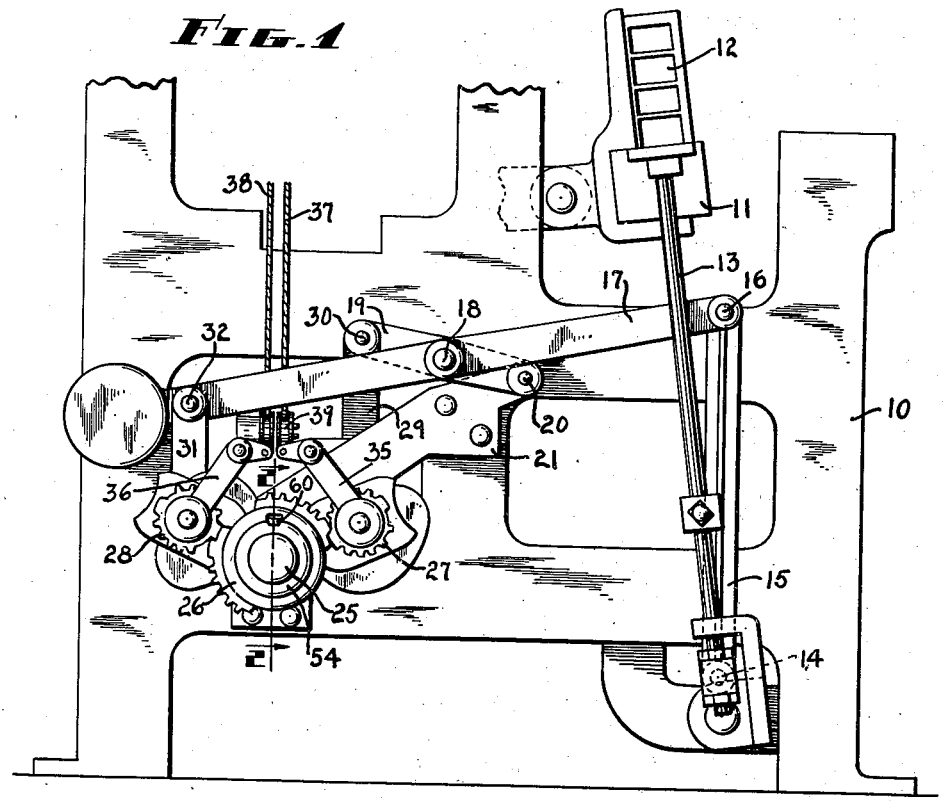
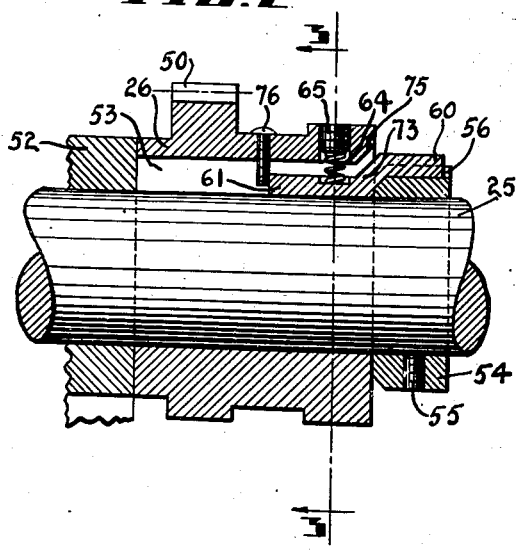
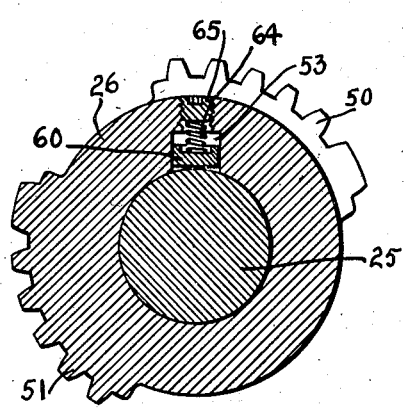
INVENTOR
ANTHONY D. GARGOLINSKI
Chas. T. Hawley
ATTORNEY Dec. 8, 1942.  A. D. GARGOLINSKI  2,304,162
YIELDING DRIVE FOR LOOM BOX MOTION
Filed Feb. 23, 1942  2 Sheets-Sheet 2
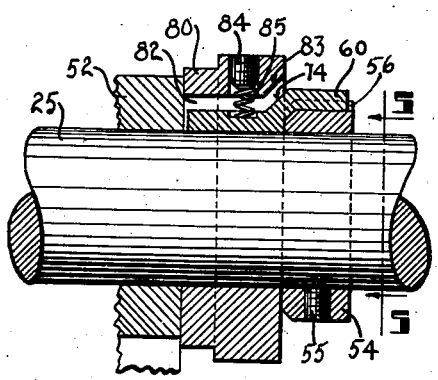
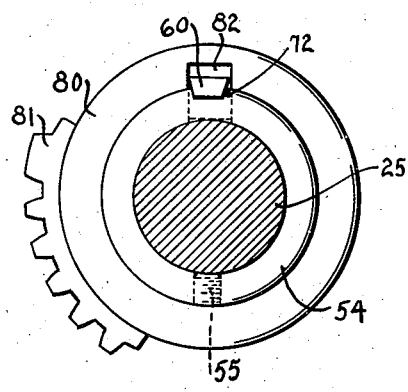
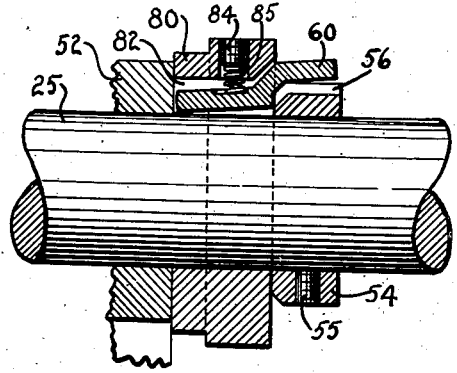
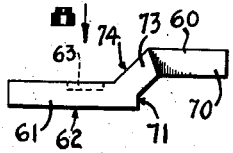
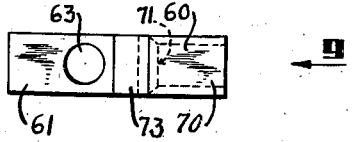
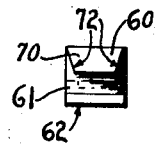
INVENTOR
ANTHONY D. GARGOLINSKI
ATTORNEY Patented Dec. 8, 1942

2,304,162

UNITED STATES PATENT OFFICE 2,304,162

YIELDING DRIVE FOR LOOM BOX MOTION

Anthony D. Gargolinski, Worcester, Mass., assignor to Crompton & Knowles Loom Works, Worcester, Mass., a corporation of Massachusetts Application February 23, 1942, Serial No. 432,002

7 Claims. (Cl. 64—29)

This invention relates to improvements in shuttle box operating mechanisms for looms and it is the general object of the invention to provide improved driving connections between the master gear of the box mechanism and the shaft which drives it.

Fancy looms operate with a plurality of shuttles movable one at a time to active position by a set of shuttle boxes which shift with respect to the lay. Certain types of box mechanisms employ a master actuating gear on the loom shaft and shiftable pinions which can be moved either into or out of driving relation with the master gear. Linkage and lever mechanism is connected between the pinions and the shuttle boxes and a partial rotation of the pinions effects a shift in the position of the boxes.

The shiftable pinions are operated by connections from a pattern mechanism and if these connections stretch or if the pattern mechanism gives an incomplete movement to the connections, the shiftable pinions may not register correctly with the master gear and the latter may establish improper mesh with the pinion. It is desirable under such conditions that a yielding driving connection be provided between the master gear and the loom shaft to prevent breakage of the gear and pinion. Mechanisms heretofore employed to accomplish this result have been costly to manufacture and have not always performed their yielding functions satisfactorily.

It is an important object of my present invention to provide a yielding connection between the loom shaft and the master gear comprising a key movable radially against spring action to disconnect the master gear from the driving shaft or some part fastened thereto. The key preferably extends along the shaft and floats in key slots formed in the master gear and a driving member, such as a collar secured to the shaft.

The key is held in operative position by a spring but is otherwise loosely mounted, and it is a further object of my present invention to position the key by engagement of abutting shoulders or the like on it with stop means arranged along the shaft. The stop means confines the key and keeps it in proper driving position.

It is another object of my present invention to provide an improved form of driving key one end of which is made so that it can be received by a key slot in the master gear and also receive the thrust of a spring, while the other end is made with beveled driven surfaces for cooperation with similar driving surfaces on a collar secured to the shaft. The latter is also made with a shoulder between its ends for engagement with the collar, while the end in the master gear is made preferably though not necessarily for engagement with supporting structure for the box operating mechanism, such as a bearing.

With these and other objects in view which will appear as the description proceeds, my invention resides in the combination and arrangement of parts hereinafter described and set forth, In the accompanying drawings, wherein two forms of my invention are set forth, Fig. 1 is an end elevation of a portion of a loom showing a box motion equipped with the preferred form of my present invention to operate with four shuttles, Fig. 2 is an enlarged vertical section on line 2—2 of Fig. 1, Fig. 3 is a vertical section on line 3—3 of Fig. 2, Fig. 4 is a view similar to Fig. 2 but showing a modified form of my invention applied to a box mechanism built to accommodate two shuttles, Fig. 5 is a vertical section on line 5—5 of Fig. 4, Fig. 6 is a view similar to Fig. 5 but showing the key moved to disconnecting position with respect to the master gear and the driving collar, and Figs. 7, 8 and 9 are side, top and end views, respectively, of the improved key forming an important part of my present invention.

Referring to Fig. 1, I have shown a loom frame 10 having a lay 11 provided with a gang 12 of shuttle boxes which in the preferred form shown in Fig. 1 is adapted to cooperate with four shuttles. The gang 12 is mounted on a box lifter rod 13 pivoted at its lower end as at 14 to an upright link 15 the top of which is pivoted as at 16 to a box lifter lever 17. The latter is pivoted as at 18 to a lever 19 having a fixed pivot 20 on the box operating mechanism frame 21.

The bottom shaft 25 of the loom has mounted thereon a master gear 26 having two axially spaced mutilated toothed portions to be described later to cooperate with pinions 27 and 28 mounted, respectively, in front of and behind the shaft 25. Front pinion 27 is connected to an upright link 29 the top of which is pivoted as at 30 to lever 19, while the rear pinion 28 is connected by link 31 to the lever 17 at 32. The pinions 27 and 28 are connected, respectively, to positioning arms 35 and 36 the longitudinal position of which is determined by connectors 37 and 38 controlled by pattern mechanism not shown and guided by vertical rolls 39 rotatable on frame 21. As the loom operates the master gear rotates and will engage one or the other, or at times both, of the pinions 27 and 28 to determine the position of lever 17.

The matter thus far described in connection with Fig. 1 shows a well-known form of shuttle box operating mechanism. By means of connections to be described hereinafter the bottom shaft 25 imparts driving force to the master gear 26. In automatic looms the bottom shaft 25 rotates once every other pick of the loom so that the box gang 12 can be shifted on alternate picks, but I do not wish to be limited to this particular timing of the box mechanism.

In Fig. 2 the master gear 26 corresponds to that shown in Fig. 1 and has two longitudinally spaced sets of actuating teeth 50 and 51. The left end of the master gear abuts a bearing 52 carried by the frame 21 and there is extending through the master gear a key slot 53 parallel to the shaft 25 and extending radially from the shaft. A collar 54 is secured to the shaft by a set screw 55 and is the driving means in the present instance for the box mechanism. The collar has a peripheral slot 56 the side surfaces of which extend parallel to the shaft 25 and diverge outwardly from the center of the shaft.

The key 60 comprises a body 61 with parallel sides and of a width sufficient to fit snugly into the key slot 53. The bottom 62 of the key extends along and in contact with the shaft 25. The upper part of body 61 may be provided with a pocket 63 for the lower end of a compression coil spring 64 the upper end of which is positioned by an adjusting screw 65 threaded into the master gear 26 as shown in Fig. 2. The spring holds the body 61 of the key down against the shaft under normal conditions.

The outer end 70 of the key may be offset from the end 61 to define if desired a shoulder 71. As shown in Figs. 5 and 9 the sides of the end 70 are inclined as at 72 to conform to the inclination of the sides of slot 56. The body and end of the key may be joined by an intermediate diagonal section 73 which can conveniently be chamfered as at 74 to conform to a corresponding chamfer 75 formed in the outer end of the gear keyway 53. In order that the key may be held in its correct longitudinal position along the shaft I provide a pin 76 held by the master gear and extending down into the slot 53 sufficiently to be engaged by the left end of the key as viewed in Fig. 2. It is not necessary that the pin actually engage the key at all times but it should be in position to prevent the key from moving endwise along the shaft to the left as seen in Fig. 2 away from the driving collar. The collar 54 limits movement of the key to the right by engagement with the shoulder 71.

In the modified form of the invention shown in Figs. 4 and 5 the master gear 80 is shorter and has but one set of teeth 81 to engage a single pinion not shown which suffices when the loom operates with but two shuttle boxes. Gear 80 is provided with a radial keyway 82 the right end of which is chamfered upwardly and outwardly as at 83. A screw 84 tapped into the gear 80 bears at its lower end against a spring 85 which may be similar to spring 64. The key and collar on the shaft may be the same as in the preferred form, but due to the shorter length of the gear 80, the key will have the left end thereof close to the bearing 52 and pin 76 will be omitted.

Under normal conditions in both forms of the invention the coil compression spring will hold the key body against the shaft 25 and the outer end of the key will be in the slot 56 of the driving collar. The spring will be strong enough to permit the key to transmit sufficient force from the collar to the master gear to operate the shuttle box mechanism when the latter is free to perform its functions in ordinary manner. If for any reason, however, movement of lever 17 should be prevented, or if either of the pinions 27 or 28 should become improperly related to the master gear so that the latter is not free to turn, the end 70 of the key will move radially away from the shaft 25 because of its inclined surfaces 72 and the beveled edges of the slot 56. This condition is shown in Fig. 6 where it will be seen that the right end of the key has moved outwardly against spring action to disengage the key end 70 from the collar 54. After the cause of the disengagement has been corrected, the shaft 25 and master gear can be turned relatively to each other until the key is again seated in the slot 56, after which the mechanism will be able to resume normal operation.

From the foregoing it will be seen that I have provided a simple and reliable form of driving connection between the loom shaft and the master gear for the box shifting mechanism including a relatively inexpensive key one end or the body of which is housed in a key slot in a master gear and the other or projecting end of which is received by a slot in the driving collar 54. It will also be noted that the key is held yieldingly in driving position by a spring in the master gear against the action of which the key can be disengaged from the slot 56 upon obstruction to motion of the master gear. The key is provided with a shoulder which engages collar 54 to limit its motion along the shaft in a direction away from the master gear, and also has the left end thereof as viewed in Figs. 2 and 4 located for engagement with either the pin 76 or the bearing 52 to limit movement along the shaft away from the collar.

Having thus described my invention it will be seen that changes and modifications may be made therein by those skilled in the art without departing from the spirit and scope of the invention and I do not wish to be limited to the details herein disclosed, but what I claim is:

1. In a shuttle box operating mechanism for a loom having a driving shaft and a bearing therefor, a collar secured to the shaft and having in the periphery thereof a slot the sides of which extend in the direction of the length of the shaft and are inclined toward the shaft axis, a gear loosely mounted on the shaft between the collar and the bearing and having a key slot therein extending in the direction of the length of the shaft, a key having one end thereof located in the slot in the gear and having the other end formed with inclined sides to conform to and engage the sides of the slot in the collar, and spring means between the gear and key normally holding said other end of the key in the slot in the collar, said key being yieldable in a direction radially away from the axis of the shaft against the action of said spring means when the collar turns relatively to the gear.

2. In a shuttle box operating mechanism for a loom having a driving shaft and a bearing therefor, a collar secured to the shaft and having a peripheral slot parallel to the shaft and the sides of which diverge from the axis of the shaft, a gear loose on the shaft between the collar and the bearing and having a radial key slot parallel to the shaft, a key located in the radial slot and having an extended end projecting into the slot in the collar and having surfaces to engage and conform to said divergent sides of the peripheral slot, and a spring between the gear and that part of the key located in the key slot in the gear to hold said extended end of the key yieldingly in the collar slot and yield when the key moves radially away from the shaft axis due to relative movement of the gear and collar.

3. In a shuttle box operating mechanism for a loom having a driving shaft and a bearing therefor, a collar secured to the shaft and having a peripheral slot parallel to the shaft, the sides of said slot diverging away from the shaft axis, the bottom of said slot being spaced from the periphery of the shaft, a gear loose on said shaft and located between the collar and the bearing and having a key slot extending radially away from and parallel to the shaft, a key having a body located within the radial key slot and engaging the shaft and having an offset end to fit into the collar slot, said offset end having sides diverging away from the shaft axis to engage said sides of the peripheral slot, and a compression spring between the gear and key body and exerting a force on the key directed toward the shaft axis to hold said offset end of the key yieldingly in said peripheral slot, said spring yieldable when the key moves radially in said key slot of the gear due to relative motion of the gear and collar and cooperation of the divergent sides of said peripheral slot and offset end of said key.

4. In a shuttle box operating mechanism for a loom having a driving shaft and a bearing therefor, a collar secured to the shaft and having a peripheral slot parallel to the shaft, the sides of said slot diverging away from the shaft axis, the bottom of said slot being spaced from the periphery of the shaft, a gear located between the collar and the bearing and having a key slot extending radially away from the shaft, a key having a body located within the radial key slot and engaging the shaft and having an offset end to fit into the collar slot and having sides diverging away from the shaft axis to engage said sides of the peripheral slot, and a compression spring between said gear and body to exert a force on the key directed toward the shaft axis to hold said offset end of the key yieldingly in said peripheral slot, said spring yieldable when the key moves radially in said key slot of the gear due to relative motion of the gear and collar and cooperation of the divergent sides of said peripheral slot and extended end of said key, that part of the key located in said radial slot being held against longitudinal motion along the shaft away from said gear by said collar.

5. In a shuttle box operating mechanism for a loom having a driving shaft and a bearing therefor, a collar secured to the shaft and having a peripheral slot parallel to the shaft, the sides of said slot diverging away from the shaft axis, the bottom of said slot being spaced from the periphery of the shaft, a gear located between the collar and the bearing and having a key slot extending radially away from the shaft, a key having a body located within the radial key slot and engaging the shaft and having an offset end to fit into the collar slot and having sides diverging away from the shaft axis to engage said sides of the peripheral slot, and a compression spring between said gear and body to exert a force on the key directed toward the shaft axis to hold said offset end of the key yieldingly in said peripheral slot, said spring yieldable when the key moves radially in said key slot of the gear due to relative motion of the gear and collar and cooperation of the divergent sides of said peripheral slot and extended end of said key, that part of the key located in said radial slot being held against longitudinal motion along the shaft away from said collar by said bearing.

6. In a shuttle box operating mechanism for a loom having a driving shaft and a bearing therefor, a collar secured to the shaft, a gear loose on the shaft and located between the bearing and the collar, said collar and gear having longitudinally extending key receiving slots, a key floating in said slots, and spring means in said gear acting on said key to hold the latter yieldingly in driving relation with respect to said collar.

7. In a shuttle box operating mechanism for a loom having a driving shaft and a bearing therefor, a collar secured to the shaft, a gear loose on the shaft and located between the bearing and the collar, said collar and gear having longitudinally extending key receiving slots, a key floating in said slots, spring means in said gear acting on said key to hold the latter yieldingly in driving relation with respect to said collar, and means carried by the gear projecting into the slot in said gear for engagement with said key to limit movement of the latter in a direction away from said collar.

ANTHONY D. GARGOLINSKI.